United States Patent
Varadarajan et al.

(10) Patent No.: US 10,349,060 B2
(45) Date of Patent: Jul. 9, 2019

(54) ENCODING VIDEO FRAMES USING GENERATED REGION OF INTEREST MAPS

(71) Applicant: INTEL CORPORATION, Santa Clara, CA (US)

(72) Inventors: Srenivas Varadarajan, Bangalore (IN); Yiting Liao, Hillsboro, OR (US); Vallabhajosyula S. Somayazulu, Portland, OR (US); Omesh Tickoo, Portland, OR (US); Ibrahima J. Ndiour, Chandler, AZ (US); Javier Perez-Ramirez, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 15/640,202

(22) Filed: Jun. 30, 2017

(65) Prior Publication Data

US 2019/0007690 A1    Jan. 3, 2019

(51) Int. Cl.
*H04N 19/167* (2014.01)
*H04N 19/17* (2014.01)
*H04N 19/176* (2014.01)

(52) U.S. Cl.
CPC ......... *H04N 19/167* (2014.11); *H04N 19/17* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 2009/0086816 A1* | 4/2009 | Leontaris | H04N 19/80 375/240.03 |
| 2014/0195138 A1* | 7/2014 | Stelzig | G08G 1/0116 701/119 |
| 2015/0287214 A1* | 10/2015 | O'Gorman | G06K 9/00771 348/159 |
| 2016/0375768 A1* | 12/2016 | Konet | B60K 35/00 348/148 |
| 2017/0017299 A1* | 1/2017 | Biedert | G06F 3/013 |
| 2017/0185867 A1* | 6/2017 | Lee | G06K 9/0063 |
| 2017/0243067 A1* | 8/2017 | Bulan | G06K 9/00771 |
| 2017/0316333 A1* | 11/2017 | Levinson | G01S 17/87 |
| 2018/0191952 A1* | 7/2018 | Ardo | H04N 21/2187 |
| 2018/0249095 A1* | 8/2018 | Lee | H04N 5/33 |
| 2018/0300583 A1* | 10/2018 | Peng | G06K 9/4671 |
| 2018/0302590 A1* | 10/2018 | Kuzyakov | G06T 5/002 |
| 2018/0302591 A1* | 10/2018 | Pio | H04N 7/0117 |

* cited by examiner

*Primary Examiner* — Reza Aghevli
(74) *Attorney, Agent, or Firm* — International IP Law Group, P.L.L.C.

(57) ABSTRACT

An example apparatus for encoding video frames includes a receiver to receive video frames and a heat map from a camera and expected object regions from a video database. The apparatus also includes a region of interest (ROI) map generator to detect a region of interest in a video frame based on the expected object regions. The ROI map generator can also detect a region of interest in the video frame based on the heat map. The ROI map generator can then generate an ROI map based on the detected regions of interest. The apparatus further includes a parameter adjuster to adjust an encoding parameter based on the ROI map. The apparatus also further includes a video encoder to encode the video frame using the adjusted encoding parameter.

25 Claims, 6 Drawing Sheets

ENCODING VIDEO FRAMES USING GENERATED REGION OF INTEREST MAPS

BACKGROUND

Edge devices may be used to detect objects. For example, an edge device may be a camera that is connected to the Internet. The edge device may capture video and send the captured video to an object detector. For example, the object detector may be an object detection service based in the cloud. The object detector may then detect one or more objects in the captured video.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, an edge device may capture video and send the captured video to an object detector. An edge device is a device which provides an entry point into enterprise or service provider core networks. Examples of edge devices include routers, routing switches, integrated access devices (IADs), multiplexers, and a variety of metropolitan area network (MAN) and wide area network (WAN) access devices. In some examples, an edge device may be part of an Internet of Things (IoT) framework that transmits information to a server for object detection. IoT frameworks generally may include low-powered edge devices that perform data capture and a set of cloud computing devices that perform computationally intensive tasks on the data transmitted from the edge devices. Computer-vision tasks like object recognition may be highly compute-intensive. Therefore, computer vision algorithms may generally be run on the cloud. For example, the cloud may be a network of remote servers hosted on the Internet and used to store, manage, and process data in place of local servers or personal computers. However, raw video data transmitted to the cloud for processing may consume a lot of bandwidth. Thus, some computer vision systems may compress video frames before transmitting the frames over the network to the cloud for object detection. However, video-compression introduces visual artifacts and loss of details in the video frames which affect the accuracy of computer vision algorithms.

The present disclosure relates generally to techniques for encoding video using region of interest maps. Specifically, the techniques described herein include an apparatus, method and system for encoding video using region of interest maps. An example apparatus includes a receiver to receive video frames and a heat map from a camera and expected object regions from a video database. The apparatus includes a region of interest (ROI) map generator to detect a region of interest in a video frame based on the expected object regions. The ROI map generator can also detect a region of interest in the video frame based on the heat map. In some examples, the ROI map generator can detect a region of interest based on a received object detection in a previous frame. In some examples, the ROI map generator can detect a region of interest based on a detected new object. The ROI map generator can then generate an ROI map based on the detected regions of interest. The apparatus also includes a parameter adjuster to adjust an encoding parameter based on the ROI map. The apparatus further includes a video encoder to encode a video frame using the adjusted encoding parameter.

The techniques described herein thus enable a high object recognition accuracy at a lower given bit-rate. For example, techniques described herein may achieve a highly accurate ROI and an efficient utilization of compressed bits. For example, areas not corresponding to any ROI may be compressed higher than areas corresponding to ROIs rather than compressing all areas equally. In addition, the techniques described herein can preserve in the compressed video, any generic image features extracted by any state-of-the-art deep neural network (DNN) used in the cloud for object detection and are not limited to a set of specific features. Further, rather than encoding all regions of the video containing significant gradients at a higher bitrate than regions not containing significant gradients, the techniques described herein may estimate more precisely the regions containing significant objects and encodes them at a higher quality for a given bit rate. This may help to achieve a lower bitrate for the same object detection accuracy. In addition, using dedicated object models may assist in a more reliable tracking of articulated objects like humans. Additionally, the use of a feedback channel to convey prior bounding boxes from the cloud to the edge processor may increase the accuracy of ROI detection. Furthermore, the techniques described herein may take advantage of existing elements of compressed video to increase accuracy and speed. In addition, the techniques described herein are agnostic to the image features or particular object recognition algorithm used in the cloud and thus may be used with a variety of object detectors.

Figure 1:
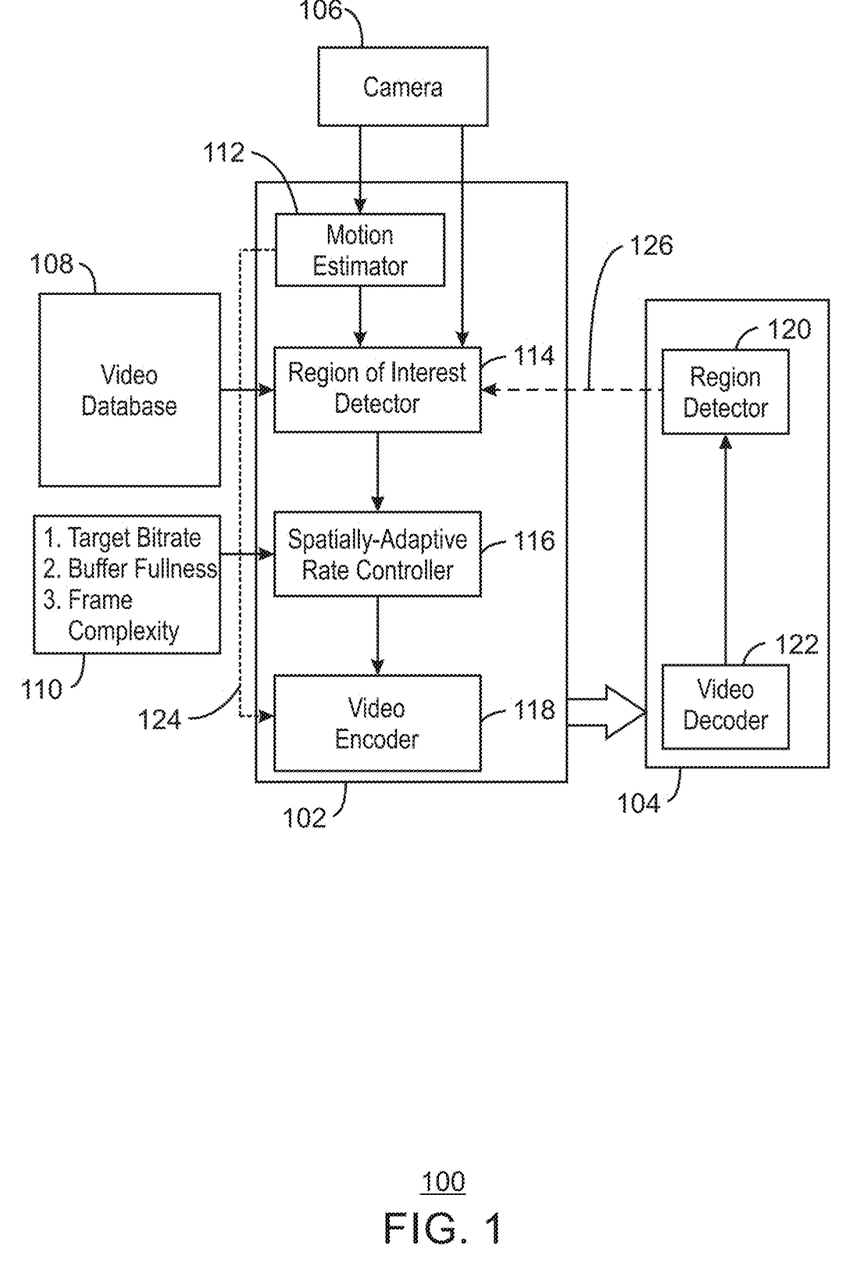
FIG. 1 is a block diagram illustrating an example system for encoding video frames using region of interest maps.

FIG. 1 is a block diagram illustrating an example system for encoding video frames using region of interest maps. The example system is referred to generally by the reference number 100 and can be implemented in the computing device 500 below in FIG. 5 using the method 400 of FIG. 4 below.

The example system 100 includes an edge processor 102, a cloud processor 104, a camera 106, a video database 108, and a user interface 110. The edge processor 102 includes a motion estimator 112, region of interest detector 114, a spatially-adaptive rate controller 116, and a video encoder 118. The cloud processor 104 includes a region detector 120 and a video decoder 122.

As shown in FIG. 1, the edge processor 102 may receive video frames from the camera 106 and send encoded video frames to the cloud processor 104 for region detection. For example, the motion estimator 112 may receive a current video frame and divide the video frame into Macroblocks (MBs). For example, the MBs may each be 16×16 pixels in size. For each MB of the current frame, the motion estimator 112 may select a closest matching region from the previous frame through Motion Estimation. The spatial displacement of the current MB from the closest matching region is the Motion Vector (MV) for the MB. The displacement may be measured in number of pixels. In some examples, the difference between the pixels in the two regions constitute a residual for the MB. The error in motion estimation (ME Error) can be quantified as the Sum of Absolute Difference (SAD) or the Sum of Squared Error (SSE) and can be derived from the residual.

The region of interest detector 114 can detect regions of interest. In some examples, regions of interest can be detected based on a priori expected regions from the video database 108. The a priori expected regions may be obtained empirically from a large amount of video data obtained in a specified set up on which the ground-truth locations of the object of interest are annotated. The video data may include 100+ hours of video data. For example, while detecting pedestrians on a road using an external camera mounted on a car, some regions of the video may contain more human activity than others and thus be annotated as ground-truth locations of objects of interest for persons.

In some examples, the region of interest detector 114 can detect regions of interest in a video frame based on a received heat map. The heat map may be a dynamic heat map from the current video frame. For example, the locations of some objects like pedestrians can be detected using non-visual modalities like Infra-red (IR) sensors or through specialized cameras. For these objects, one can obtain a dynamic heat map of the scene that better reflects the current location of the objects and the corresponding ROIs in the captured video. In some examples, specialized cameras like Dynamic Vision Sensor (DVS) cameras can also be used to infer ROIs through detecting change in the intensity of light falling on the DVS sensors.

Moreover, in some examples, the region of interest detector 114 can detect regions of interest in a video frame based on prior region detections in a previous frame. For example, given a detected region in the previous frame, a larger region of interest box can be assigned as the ROI in the current frame, as the object may move anywhere in this region. In some examples, the size of the box may be depend on the video frame rate, the upper bound of the moving speed, etc. In some examples, the region of interest detector 114 can detect an ROI from previous detections and the amount of object motion between current and the past frames. For example, an average of all motion vectors (MVs) falling with in the previously detected bounding box can be used to calculate an expected shift of the bounding box in the current frame and hence the ROI.

In some examples, the region of interest detector 114 can detect regions of interest in a video frame based on appearance of "new" objects in a video frame which was not present in the previous frame. For example, these objects may neither have been detected nor tracked from the previous frame. Since there are no matching regions in the previous frame for the MBs constituting these new object regions in the current frame, the Motion Estimation (ME) error may be high in these regions. For example, the ME may be measured as sum of squared error (SSE) or sum of absolute differences (SAD). A high ME Error may be a good indicator of new objects and hence the corresponding MBs may also constitute the ROI. In some examples, since video encoders like H.264 use intra-coded MBs in a P-frame when the ME Error is high, Intra-coded MBs can also be used for detecting new objects and ROI generation.

In some examples, the region of interest detector 114 can generate an ROI map based on the detected ROIs. For example, the ROI may constitute final ROIs for a video frame. In some examples, an ROI map may be generated for a video frame that is based on the union of the ROIs obtained based on any combination of the detected ROIs described above.

The spatially-adaptive rate controller 116 can perform spatially-adaptive QP selection. For example, the spatially-adaptive rate controller 116 may perform an optimal bit-allocation towards maximizing perceptual video quality. In some examples, the bit allocation may be performed by controlling the amount of quantization on a transformed prediction error, or residual. For example, the residual may be received form the motion estimator 112 as shown by an arrow 124. In some examples, the higher the QP, the higher the compression and the lesser the perceptual quality may be. However, in an IoT frame-work catered towards a computer vision (CV) task like Object Recognition, preserving semantics may be more important than perceptual quality. For example, semantics may include an Object ID or a summary of the scene. Thus, the ROIs obtained from the ROI detector 114 may be used for preserving semantics. In some examples, the MBs within the ROI regions may be encoded with a lower QP (higher quality), while the non-ROI MBs are coded with a higher QP (lower quality) in order to attain a highly accurate object recognition in the cloud. In some examples, a negative or a positive QP offset with respect to the frame QP can be applied at a MB level to decrease or increase the Macroblock QP, respectively. In some examples, a target bitrate, buffer fullness, and frame complexity may be received from the user interface 110. In some examples, the target bitrate may be computed by a rate-control module in a video encoder.

The video encoder 118 may perform transformation, quantization and entropy coding. For example, the video encoder 118 may be any suitable video encoder. In some examples, the pixel error between the current MB and the closest matching MB is first transform coded by applying Direct Cosine Transform (DCT) and the frequency coefficients are quantized using the QP obtained from the spatially-adaptive rate controller 116. In some examples, the quantized data can then be entropy coded and transmitted to the cloud processor 104. By encoding the ROIs with a higher fidelity and the non-ROIs with a lower fidelity, higher object recognition accuracy may be obtained at a given bit-rate when compared to encoding video at uniform fidelity using the same bit-rate.

The cloud processor 104 may thus receive encoded video frames from the edge processor 102 and detect objects. For example, the video decoder 122 may decode the received video from the edge processor 102 into RGB frames. In some examples, these decoded frames are input to a trained DNN, such as the Fast-R CNN, for detecting the objects of interest. In some examples, the region detections corresponding to detected objects may then be relayed back to the edge processor 102, as shown by a dotted arrow 126, for computing ROIs in future video frames.

The diagram of FIG. 1 is not intended to indicate that the example system 100 is to include all of the components shown in FIG. 1. Rather, the example system 100 can be implemented using fewer or additional components not illustrated in FIG. 1 (e.g., additional processors, cameras, etc.). For example, additional contextual information such as camera location, captured scene, detected object characteristics may be available to facilitate the ROI detection.

Figure 2:
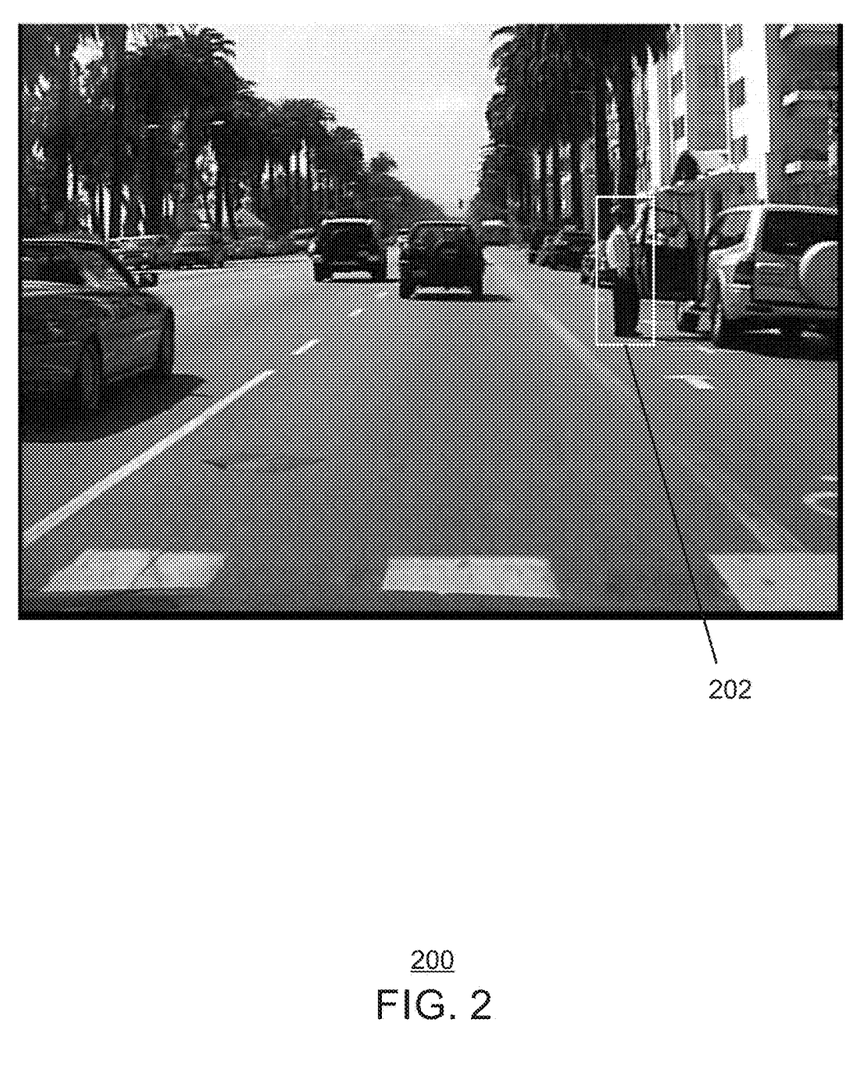
FIG. 2 is an image illustrating an example previous frame with a detected region corresponding to an object.

FIG. 2 is an image illustrating an example previous frame with a detected region corresponding to an object. The example previous frame is generally referred to by the reference number 300A and can be implemented in the computing device 500 below. For example, the previous video frame 300A can be generated using the camera 106 of FIG. 1 above or the image sensor 526 of the computing device 500 of FIG. 5 below.

FIG. 2 shows a low resolution black and white video frame 200 of a scene including an object may have be detected and a generated region 202 including the detected object. For example, the detected object may be a person.

The diagram of FIG. 2 is not intended to indicate that the example previous video frame 200 is to include all of the components shown in FIG. 2. Rather, the example video frame 200 can include fewer or additional components not illustrated in FIG. 2 (e.g., additional pixels, detected objects, regions, etc.).

Figure 3:
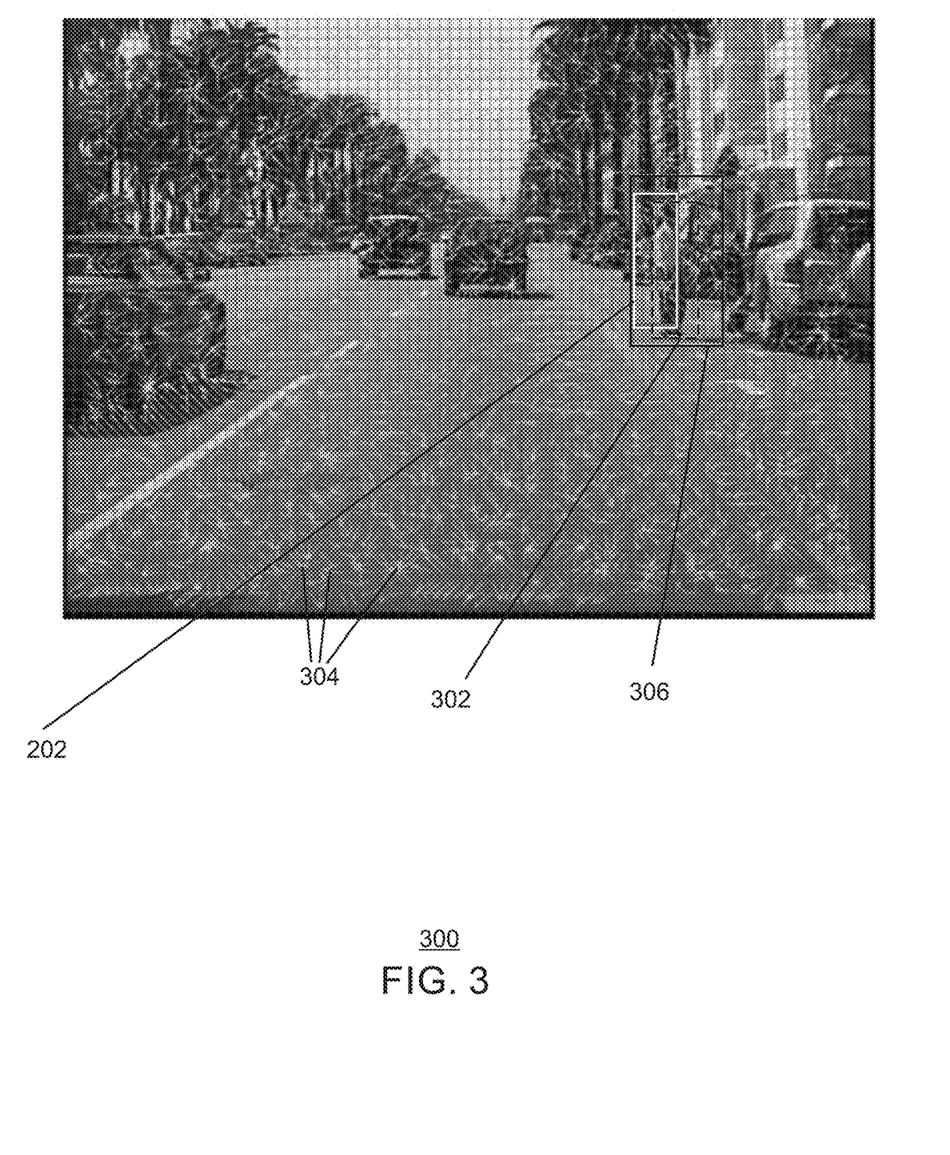
FIG. 3 is an image illustrating an example region of interest detection.

FIG. 3 is an image illustrating an example region of interest detection. The example region of interest detection is generally referred to by the reference number 300 and can be implemented in the computing device 500 below. For example, the region of interest detection 300 can be performed using the method 400 of FIG. 4, the ROI map generator 532 of the computing device 500 of FIG. 5 below, or the ROI map generator module 608 of the computer readable media 600 of FIG. 6 below.

The example region of interest detection 300 of FIG. 3 shows the region 202 corresponding to a detected object from the previous frame 200 of FIG. 2 above, an ROI 302 computed based on motion vectors 304, and an approximate ROI 306.

As shown in FIG. 3, in some examples, an approximate ROI 306 can be based on prior object detections in a previous frame. As shown in FIG. 3, in response to receiving a detection 202 in the previous frame, a larger approximate ROI 306 centered in the previous detection bounding box 202 may be assigned as an ROI in the current frame. For example, the object may move anywhere in this region. In some examples, the size of the box may depend on the video frame rate, the upper bound of the moving speed of the object, etc.

In some examples, an ROI 302 may be computed from previous detections and the amount of object motion between current and the past frames. For example, the average of all motion vectors 304 falling with in the previously detected bounding box, may be used to determine an expected shift of the bounding box in the current frame and hence the ROI. The motion vectors 304 indicated by arrows may be obtained by performing motion estimation (ME) on the 8×8 blocks indicated by the grid of smaller boxes of the current frame with regard to the previous video frame 200. The bounding box 202 of the person as detected by the object recognition algorithm in the cloud on the past key frame is shown by the rectangle 202. The ROI 302 in the current frame may be estimated using the motion vectors that point inside the bounding box.

The diagram of FIG. 3 is not intended to indicate that the example region of interest detection 300 is to include all of the components shown in FIG. 3. Rather, the example region of interest detection 300 can be implemented using fewer or additional components not illustrated in FIG. 3 (e.g., additional regions of interest, pixels, etc.).

Figure 4:
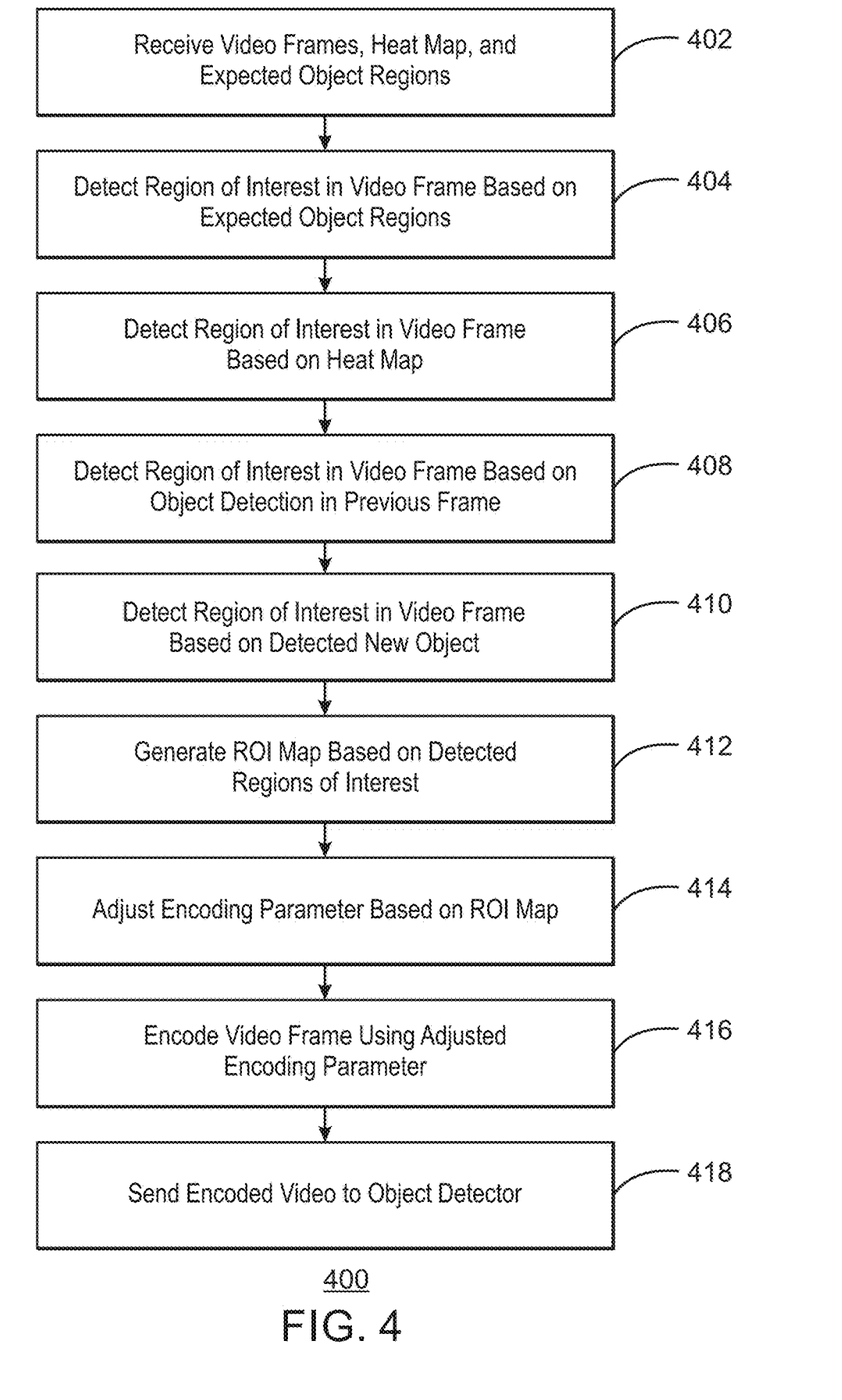
FIG. 4 is a flow chart illustrating a method for encoding video using region of interest maps.

FIG. 4 is a flow chart illustrating a method for encoding video using region of interest maps. The example method is generally referred to by the reference number 400 and can be implemented in the edge processor device 102 of FIG. 1 above, the processor 502 of the computing device 500 of FIG. 5 below, or the computer readable media 600 of FIG. 6 below.

At block 402, a processor receives video frames and a heat map from a camera and expected object regions from a video database. For example, the heat map may be a dynamic heat map from a current video frame of the video frames.

At block 404, the processor detects a region of interest in a video frame based on the expected object regions. For example, the expected object regions may be a priori expected regions obtained empirically from a large amount of video data.

At block 406, the processor detects a region of interest in the video frame based on the heat map. For example, the heat map can be used to detect current locations of objects in the video frame and mark the locations as regions of interest.

At block 408, the processor detects a region of interest based on a received object detection in a previous frame. For example, a larger region of interest may be assigned centered on the object detection from the previous frame.

At block 410, the processor detects a region of interest based on a detected new object. For example, the new object may not have been detected nor tracked in a previous frame. In some examples, new objects may be detected based on a detected high ME error. In some examples, intra-coded MBs in predictive P-frames may be used to detect a region of interest.

At block 412, the processor generates an ROI map based on the detected regions of interest. In some examples, the ROI map may be generated based on a union of the detected regions of interest. For example, the processor can detect overlapping regions of interest and include the overlapping regions of interest in the ROI map. In some examples, the processor can include unions of two or more overlapping regions of interest in the ROI map. In some examples, the processor can include unions of three or more overlapping regions of interest in the ROI map.

At block 414, the processor adjusts an encoding parameter based on the ROI map. For example, the encoding parameter may be a quantization parameter (QP). In some examples, the encoding parameters may be adjusted based on the ROI map to improve the performance of the computer vision algorithms for a given bandwidth. For example, the processor can apply a positive QP offset to a macroblock of the video frame in response to detecting the macroblock is not within a union of ROIs of the ROI map. The processor can apply a negative QP offset to a macroblock of the video frame in response to detecting the macroblock is within a union of ROIs of the ROI map.

At block 416, the processor encodes the video frame using the adjusted parameter. For example, the processor may encode an area of the video frame corresponding to a region of interest encoded in higher fidelity and encode an area of the video frame not corresponding to any region of interest encoded in lower fidelity. Thus, the adjusted parameter may be used to compress regions of a video frame outside regions of interest, while maintaining quality of the regions of interest. Pixels in the video frame corresponding to regions of interest in the ROI map may be encoded in higher quality than other regions.

At block 418, the processor sends the encoded video frame to an object detector. For example, the processor may have the encoded video frame sent to a cloud processor over any suitable network connection. In some examples, the cloud processor may be part of an Internet of Things (IoT) network.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

Figure 5:
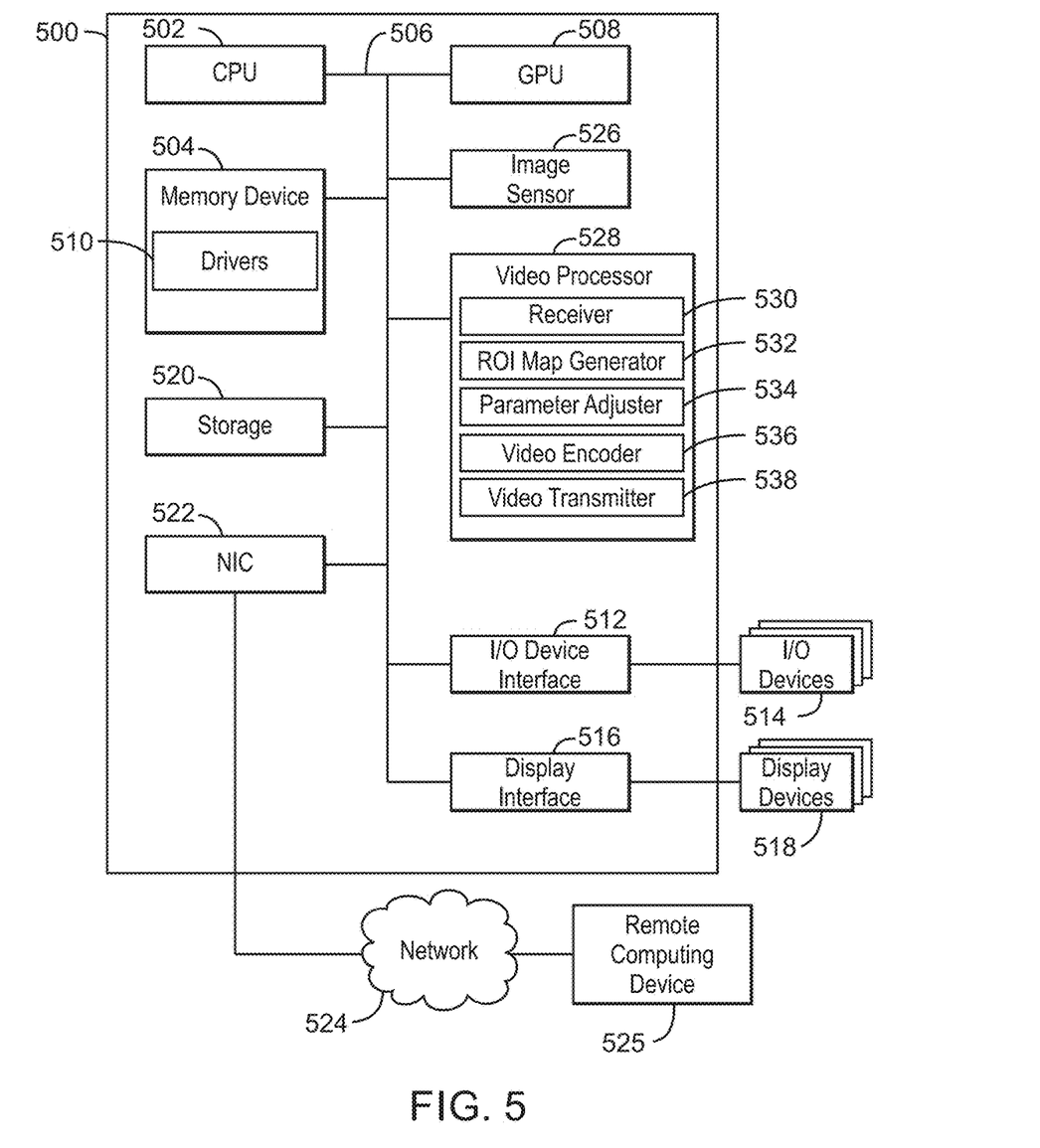
FIG. 5 is block diagram illustrating an example computing device that can encode video using region of interest maps.

Referring now to FIG. 5, a block diagram is shown illustrating an example computing device that can encode video using region of interest maps. The computing device 500 may be, for example, a laptop computer, desktop computer, tablet computer, mobile device, or wearable device, among others. In some examples, the computing device 500 may be a smart camera or a digital security surveillance camera. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for device discovery. The device drivers 510 may be software, an application program, application code, or the like.

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for generating virtual input devices. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes an image sensor 526. The image sensor 526 may be an RGB sensor. In some examples, the image sensor 526 may be an infrared sensor or black and white sensor. In some examples, the image sensor 526 may be a dynamic vision sensor (DVS). For example, a DVS may be a low bit rate, low power consumption camera sensor. Unlike standard cameras, where videos are captured in a synchronous manner, DVS cameras may be completely asynchronous, generating information only when changes in the perceived video frames happen over time. For example, a dynamic vision sensor may include one or more smart pixels. In some examples, the each of the smart pixels may operate as a separate entity. For example, the smart pixels may each generate information about the perceived image asynchronously. The smart pixels may generate information to indicate changes in the perceived light intensity. This information may be conveyed in the form of events. For example, the events can include a binary flag, indicating the polarity of the event—'1' for positive change in perceived light intensity and '0' for negative change in perceived light intensity, and the pixel addresses and time stamps in which each event happened. Dynamic vision sensors may have excellent temporal resolution, capable of generating events with timing precision of up to 1 microsecond. For example, a normal operation of a dynamic vision sensor may be equivalent to standard camera sensors sampling at approximately 20,000 frames per second (FPS) in most video capture scenarios.

The computing device 500 further includes a video processor 528. For example, the video processor 528 can be used to encode captured video to be sent to an object detector for object detection. The video processor 528 can include a receiver 530, an ROI map generator 532, a parameter adjuster 534, a video encoder 536, and a video transmitter 538. In some examples, each of the components 530-538 of the video processor 528 may be a microcontroller, an embedded processor, or a software module.

The receiver 530 can receive video frames and a heat map from a camera and expected object regions from a video database. For example, the heat map comprises hot areas corresponding to new temporal activity. In some examples, the camera may include a dynamic vision sensor. The ROI map generator 532 can detect a region of interest in a video frame based on the expected object regions. The ROI map generator 532 can detect a region of interest in the video frame based on the heat map. In some examples, the ROI map generator 532 can detect a region of interest based on a received object detection in a previous frame. In some examples, the ROI map generator 532 can detect a region of interest based on a detected new object. In some examples, the detected regions of interested may be defined to preserve semantic inference. The regions of interest may be defined based on detected objects to preserve semantic inference in the frame rather than overall perceptual quality of the frame. For example, the perceptual quality in non-ROI regions may be lower than the ROI regions when encoding as described below. The ROI map generator 532 can then generate an ROI map based on the detected regions of interest. For example, the ROI map may be a union of the detected regions of interest. The parameter adjuster 534 can adjust an encoding parameter based on the ROI map. The video encoder 536 can encode the video frame using the adjusted encoding parameter. For example, the encoded video frame may include an area corresponding to a region of interest encoded in higher fidelity and an area not corresponding to any region of interest encoded in lower fidelity. The video transmitter 538 can transmit the encoded video frame to an object detector.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. Furthermore, any of the functionalities of the video processor 528, including the receiver 530, the ROI map generator 532, the parameter adjuster 534, the video encoder 536, and the video transmitter 538 may be partially, or entirely, implemented in hardware and/or in a processor. For example, any of the functionality of the video processor 528, including the receiver 530, the ROI map generator 532, the parameter adjuster 534, the video encoder 536, and the video transmitter 538, may be implemented with an application specific integrated circuit, in logic implemented in a processor, in logic implemented in a specialized graphics processing unit such as the GPU 508, or in any other device.

Figure 6:
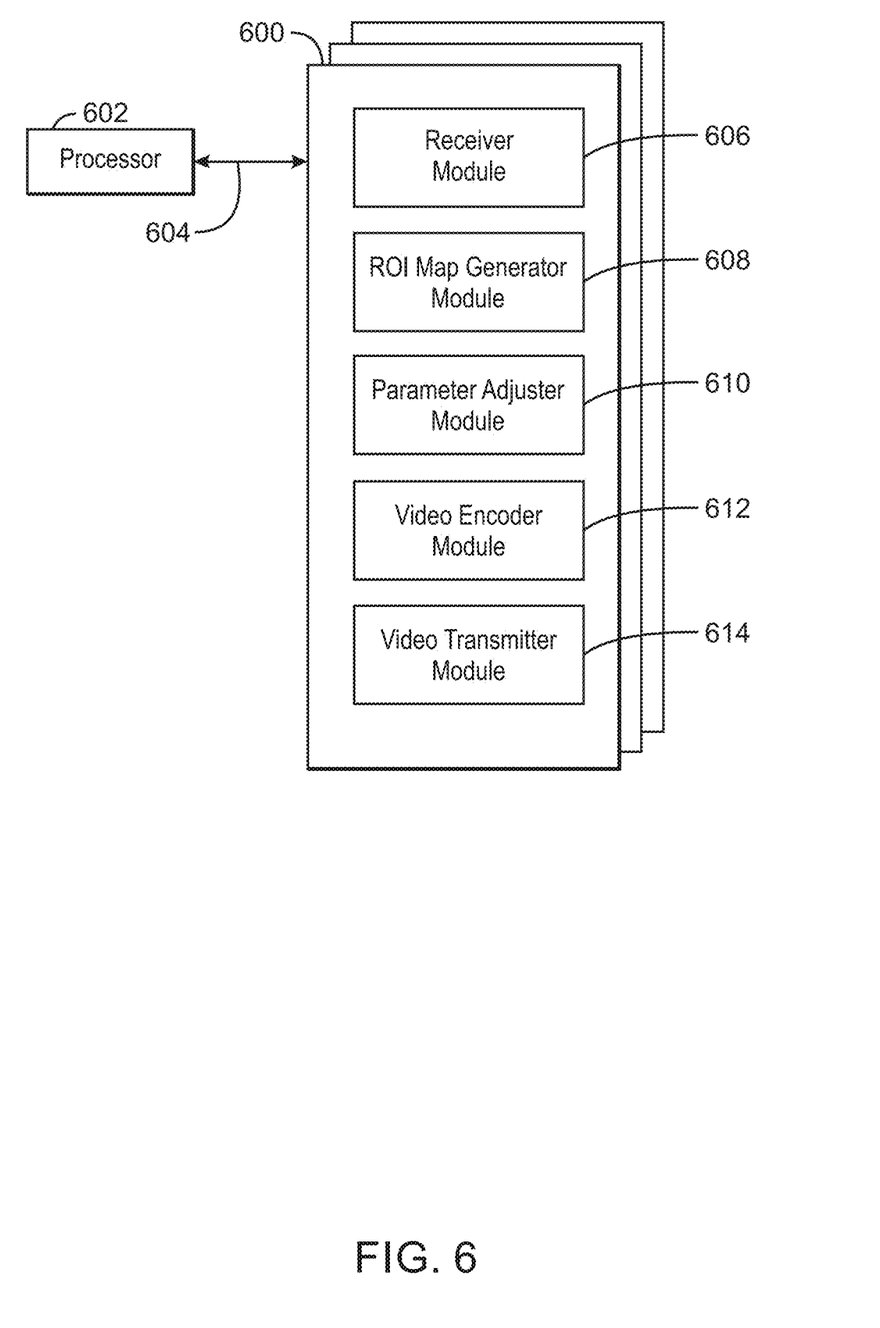
FIG. 6 is a block diagram showing computer readable media that store code for encoding video using region of interest maps.

FIG. 6 is a block diagram showing computer readable media 600 that store code for encoding video using region of interest maps. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a receiver module 606 may be configured to receive video frames and a heat map from a camera and expected object regions from a video database. In some examples, the receiver module 606 may be configured to empirically obtain the expected object regions from a large amount of video data. An ROI map generator module 608 may be configured to detect a region of interest in a video frame based on the expected object regions. In some examples, the ROI map generator module 608 may be configured to detect a region of interest in the video frame based on the heat map. In some examples, the ROI map generator module 608 may be configured to detect a region of interest based on a received object detection in a previous frame. In some examples, the ROI map generator module 608 may be configured to detect a region of interest based on a detected new object. In some examples, the ROI map generator 608 may be configured to define the regions of interest to preserve semantic inference. In some examples, the ROI map generator module 608 may be configured to generate an ROI map based on the detected regions of interest. For example, the ROI map generator module 608 may be configured to detect overlapping regions of interest and include the overlapping regions of interest in the ROI map. A parameter adjuster module 610 may be configured to adjust an encoding parameter based on the ROI map. For example, the parameter adjuster module 610 may be configured to apply a positive QP offset to a macroblock of the video frame in response to detecting the macroblock is not within a union of ROIs of the ROI map. The parameter adjuster module 610 may also be configured to apply a negative QP offset to a macroblock of the video frame in response to detecting the macroblock is within a union of ROIs of the ROI map. A video encoder module 612 may be configured to encode the video frame using the adjusted encoding parameter. For example, the video encoder module 612 may be configured to encode an area of the video frame corresponding to a region of interest encoded in higher fidelity and an area of the video frame not corresponding to any region of interest encoded in lower fidelity. A video transmitter module 614 may be configured to transmit the encoded video frame to an object detector.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

EXAMPLES

Example 1 is an apparatus for encoding video frames. The apparatus includes a receiver to receive video frames and a heat map from a camera and expected object regions from a video database. The apparatus also includes a region of interest (ROI) map generator to detect a region of interest in a video frame based on the expected object regions. The region of interest (ROI) map generator is to also detect a region of interest in the video frame based on the heat map. The region of interest (ROI) map generator is to further generate an ROI map based on the detected regions of interest. The apparatus also includes a parameter adjuster to adjust an encoding parameter based on the ROI map. The apparatus also further includes a video encoder to encode the video frame using the adjusted encoding parameter.

Example 2 includes the apparatus of example 1, including or excluding optional features. In this example, the ROI map generator is to further detect a region of interest based on a received object detection in a previous frame.

Example 3 includes the apparatus of any one of examples 1 to 2, including or excluding optional features. In this example, the ROI map generator is to further detect a region of interest based on a detected new object.

Example 4 includes the apparatus of any one of examples 1 to 3, including or excluding optional features. In this example, the apparatus includes a video transmitter to transmit the encoded video frame to an object detector.

Example 5 includes the apparatus of any one of examples 1 to 4, including or excluding optional features. In this example, the heat map includes hot areas corresponding to new temporal activity.

Example 6 includes the apparatus of any one of examples 1 to 5, including or excluding optional features. In this example, the encoded video frame includes an area corresponding to a region of interest encoded in higher fidelity and an area not corresponding to any region of interest encoded in lower fidelity.

Example 7 includes the apparatus of any one of examples 1 to 6, including or excluding optional features. In this example, the ROI map includes a union of the detected regions of interest.

Example 8 includes the apparatus of any one of examples 1 to 7, including or excluding optional features. In this example, the regions of interest are defined to preserve semantic inference.

Example 9 includes the apparatus of any one of examples 1 to 8, including or excluding optional features. In this example, the expected object regions include a priori expected regions obtained from a large amount of video data.

Example 10 includes the apparatus of any one of examples 1 to 9, including or excluding optional features. In this example, the camera includes a dynamic vision sensor.

Example 11 is a method for encoding video frames. The method includes receiving, at a processor, video frames and a heat map from a camera and expected object regions from a video database. The method also includes detecting, via the processor, a region of interest (ROI) in a video frame based on the expected object regions. The method further includes detecting, via the processor, a region of interest in the video frame based on the heat map. The method also further includes generating, via the processor, an ROI map based on the detected regions of interest. The method also includes adjusting, via the processor, an encoding parameter based on the ROI map. The method further includes encoding, via the processor, the video frame using the adjusted parameter.

Example 12 includes the method of example 11, including or excluding optional features. In this example, the method includes sending, via the processor, the encoded video frame to an object detector.

Example 13 includes the method of any one of examples 11 to 12, including or excluding optional features. In this example, the method includes detecting a region of interest based on a received object detection in a previous frame.

Example 14 includes the method of any one of examples 11 to 13, including or excluding optional features. In this example, the method includes detecting a region of interest based on a detected new object.

Example 15 includes the method of any one of examples 11 to 14, including or excluding optional features. In this example, encoding the video frame includes encoding an area of the video frame corresponding to a region of interest encoded in higher fidelity and encoding an area of the video frame not corresponding to any region of interest encoded in lower fidelity.

Example 16 includes the method of any one of examples 11 to 15, including or excluding optional features. In this example, detecting the ROI based on the expected object regions includes empirically obtaining the expected object regions from a large amount of video data.

Example 17 includes the method of any one of examples 11 to 16, including or excluding optional features. In this example, generating the ROI map includes detecting overlapping regions of interest and including the overlapping regions of interest in the ROI map.

Example 18 includes the method of any one of examples 11 to 17, including or excluding optional features. In this example, adjusting the encoding parameter based on the ROI map includes applying a positive QP offset to a macroblock of the video frame in response to detecting the macroblock is not within a union of ROIs of the ROI map.

Example 19 includes the method of any one of examples 11 to 18, including or excluding optional features. In this example, adjusting the encoding parameter based on the ROI map includes applying a negative QP offset to a macroblock of the video frame in response to detecting the macroblock is within a union of ROIs of the ROI map.

Example 20 includes the method of any one of examples 11 to 19, including or excluding optional features. In this example, the method includes defining the regions of interest to preserve semantic inference.

Example 21 is at least one computer readable medium for encoding video frames having instructions stored therein that. The computer-readable medium includes instructions that direct the processor to receive video frames and a heat map from a camera and expected object regions from a video database. The computer-readable medium also includes instructions that direct the processor to detect a region of interest in a video frame based on the expected object regions. The computer-readable medium further includes instructions that direct the processor to detect a region of interest (ROI) in the video frame based on the heat map; generate an ROI map based on the detected regions of interest. The computer-readable medium also further includes instructions that direct the processor to adjust an encoding parameter based on the ROI map. The computer-readable medium also includes instructions that direct the processor to encode the video frame using the adjusted encoding parameter.

Example 22 includes the computer-readable medium of example 21, including or excluding optional features. In this example, the computer-readable medium includes instructions to transmit the encoded video frame to an object detector.

Example 23 includes the computer-readable medium of any one of examples 21 to 22, including or excluding optional features. In this example, the computer-readable medium includes instructions to detect a region of interest based on a received object detection in a previous frame.

Example 24 includes the computer-readable medium of any one of examples 21 to 23, including or excluding optional features. In this example, the computer-readable medium includes instructions to detect a region of interest based on a detected new object.

Example 25 includes the computer-readable medium of any one of examples 21 to 24, including or excluding optional features. In this example, the computer-readable medium includes instructions to encode an area of the video frame corresponding to a region of interest encoded in higher fidelity and an area of the video frame not corresponding to any region of interest encoded in lower fidelity.

Example 26 includes the computer-readable medium of any one of examples 21 to 25, including or excluding optional features. In this example, the computer-readable medium includes instructions to empirically obtain the expected object regions from a large amount of video data.

Example 27 includes the computer-readable medium of any one of examples 21 to 26, including or excluding optional features. In this example, the computer-readable medium includes instructions to detect overlapping regions of interest and include the overlapping regions of interest in the ROI map.

Example 28 includes the computer-readable medium of any one of examples 21 to 27, including or excluding optional features. In this example, the computer-readable medium includes instructions to apply a positive QP offset to a macroblock of the video frame in response to detecting the macroblock is not within a union of ROIs of the ROI map.

Example 29 includes the computer-readable medium of any one of examples 21 to 28, including or excluding optional features. In this example, the computer-readable medium includes instructions to apply a negative QP offset to a macroblock of the video frame in response to detecting the macroblock is within a union of ROIs of the ROI map.

Example 30 includes the computer-readable medium of any one of examples 21 to 29, including or excluding optional features. In this example, the computer-readable medium includes instructions to define the regions of interest to preserve semantic inference.

Example 31 is a system for encoding video frames. The system includes a receiver to receive video frames and a heat map from a camera and expected object regions from a video database. The system includes a region of interest (ROI) map generator to detect a region of interest in a video frame based on the expected object regions. The ROI map generator is to also detect a region of interest in the video frame based on the heat map. The ROI map generator is to further generate an ROI map based on the detected regions of interest. The system includes a parameter adjuster to adjust an encoding parameter based on the ROI map. The system also includes a video encoder to encode the video frame using the adjusted encoding parameter.

Example 32 includes the system of example 31, including or excluding optional features. In this example, the ROI map generator is to further detect a region of interest based on a received object detection in a previous frame.

Example 33 includes the system of any one of examples 31 to 32, including or excluding optional features. In this example, the ROI map generator is to further detect a region of interest based on a detected new object.

Example 34 includes the system of any one of examples 31 to 33, including or excluding optional features. In this example, the system includes a video transmitter to transmit the encoded video frame to an object detector.

Example 35 includes the system of any one of examples 31 to 34, including or excluding optional features. In this example, the heat map includes hot areas corresponding to new temporal activity.

Example 36 includes the system of any one of examples 31 to 35, including or excluding optional features. In this example, the encoded video frame includes an area corresponding to a region of interest encoded in higher fidelity and an area not corresponding to any region of interest encoded in lower fidelity.

Example 37 includes the system of any one of examples 31 to 36, including or excluding optional features. In this example, the ROI map includes a union of the detected regions of interest.

Example 38 includes the system of any one of examples 31 to 37, including or excluding optional features. In this example, the regions of interest are defined to preserve semantic inference.

Example 39 includes the system of any one of examples 31 to 38, including or excluding optional features. In this example, the expected object regions include a priori expected regions obtained from a large amount of video data.

Example 40 includes the system of any one of examples 31 to 39, including or excluding optional features. In this example, the camera includes a dynamic vision sensor.

Example 41 is a system for encoding video frames. The system includes means for receiving video frames and a heat map from a camera and expected object regions from a video database. The system also includes means for detecting a region of interest in a video frame based on the expected object regions. The system further includes means for detecting a region of interest in the video frame based on the heat map. The system also further includes and means for generating an ROI map based on the detected regions of interest. The system also includes means for adjusting an encoding parameter based on the ROI map. The system further includes means for encoding the video frame using the adjusted encoding parameter.

Example 42 includes the system of example 41, including or excluding optional features. In this example, the means for generating the ROI map is to further detect a region of interest based on a received object detection in a previous frame.

Example 43 includes the system of any one of examples 41 to 42, including or excluding optional features. In this example, the means for generating the ROI map is to further detect a region of interest based on a detected new object.

Example 44 includes the system of any one of examples 41 to 43, including or excluding optional features. In this example, the system includes means for transmitting the encoded video frame to an object detector.

Example 45 includes the system of any one of examples 41 to 44, including or excluding optional features. In this example, the heat map includes hot areas corresponding to new temporal activity.

Example 46 includes the system of any one of examples 41 to 45, including or excluding optional features. In this example, the encoded video frame includes an area corresponding to a region of interest encoded in higher fidelity and an area not corresponding to any region of interest encoded in lower fidelity.

Example 47 includes the system of any one of examples 41 to 46, including or excluding optional features. In this example, the ROI map includes a union of the detected regions of interest.

Example 48 includes the system of any one of examples 41 to 47, including or excluding optional features. In this example, the regions of interest are defined to preserve semantic inference.

Example 49 includes the system of any one of examples 41 to 48, including or excluding optional features. In this example, the expected object regions include a priori expected regions obtained from a large amount of video data.

Example 50 includes the system of any one of examples 41 to 49, including or excluding optional features. In this example, the camera includes a dynamic vision sensor.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for encoding video frames, comprising:
   a receiver of an edge device to receive video frames and a heat map representing temporal activity of objects in the video frames from a camera comprising a non-visual modality and expected object regions from a video database;
   a processor of the edge device to:
      detect a first region of interest in a video frame based on the expected object regions;
      detect a second region of interest in the video frame based on the heat map;
      generate a ROI map based on the detected first and second regions of interest; and
      adjust an encoding parameter based on the ROI map; and
   a video encoder of the edge device to encode the video frame using the adjusted encoding parameter.

2. The apparatus of claim 1, wherein the processor is to further detect a third region of interest based on a received object detection in a previous frame received from a remote server.

3. The apparatus of claim 1, wherein the processor is to further detect a third region of interest based on a detected new object, wherein the new object is detected in response to not detecting that the new object corresponds to an object that is not present in or tracked from a previous frame.

4. The apparatus of claim 1, comprising a video transmitter of the edge device to transmit the encoded video frame to an object detector of a remote server.

5. The apparatus of claim 1, wherein the heat map comprises hot areas corresponding to new temporal activity.

6. The apparatus of claim 1, wherein the encoded video frame comprises an area corresponding to the first region of interest and the second region of interest encoded in higher fidelity and an area not corresponding to any region of interest encoded in lower fidelity.

7. The apparatus of claim 1, wherein the ROI map comprises a union of the detected first and second regions of interest.

8. The apparatus of claim 1, wherein the first and second regions of interest are defined to preserve semantic inference.

9. The apparatus of claim 1, wherein the expected object regions comprise a priori expected regions obtained from a large amount of video data.

10. The apparatus of claim 1, wherein the camera comprises a dynamic vision sensor to detect changes in an intensity of light.

11. A method for encoding video frames, comprising:
    receiving, at a processor of an edge device, video frames and a heat map representing temporal activity of objects in the video frames from a camera comprising a non-visual modality and expected object regions from a video database;
    detecting, via the processor, a first region of interest (ROI) in a video frame based on the expected object regions;
    detecting, via the processor, a second region of interest in the video frame based on the heat map;
    generating, via the processor, a ROI map based on the detected first and second regions of interest;
    adjusting, via the processor, an encoding parameter based on the ROI map; and
    encoding, via the processor, the video frame using the adjusted parameter.

12. The method of claim 11, comprising sending, via the processor, the encoded video frame to an object detector of a remote server.

13. The method of claim 11, comprising receiving, from a remote server via a feedback channel, an object detection in a previous frame detecting a third region of interest based on the received object detection in the previous frame.

14. The method of claim 11, comprising detecting a third region of interest based on a detected new object, wherein detecting the new object comprises detecting that the new object corresponds to an object that is not present in or tracked from a previous frame.

15. The method of claim 11, wherein encoding the video frame comprises encoding an area of the video frame corresponding to the first region of interest and the second region of interest in higher fidelity and encoding an area of the video frame not corresponding to any region of interest in lower fidelity.

16. The method of claim 11, wherein detecting the ROI based on the expected object regions comprises empirically obtaining the expected object regions from a large amount of video data.

17. The method of claim 11, wherein generating the ROI map comprises detecting overlapping regions of interest and including the overlapping regions of interest in the ROI map.

18. The method of claim 11, wherein adjusting the encoding parameter based on the ROI map comprises applying a positive quantization parameter (QP) offset to a macroblock of the video frame in response to detecting the macroblock is not within a union of ROIs of the ROI map.

19. The method of claim 11, wherein adjusting the encoding parameter based on the ROI map comprises applying a negative quantization parameter (QP) offset to a macroblock of the video frame in response to detecting the macroblock is within a union of ROIs of the ROI map.

20. The method of claim 11, comprising defining the regions of interest to preserve semantic inference.

21. At least one non-transitory computer readable medium for encoding video frames having instructions stored therein that, in response to being executed on edge computing device, cause the edge computing device to:
receive video frames and a heat map representing temporal activity of objects in the video frames from a camera comprising a non-visual modality and expected object regions from a video database;
detect a first region of interest in a video frame based on the expected object regions;
detect a second region of interest (ROI) in the video frame based on the heat map;
generate a ROI map based on the detected first and second regions of interest;
adjust an encoding parameter based on the ROI map; and
encode the video frame using the adjusted encoding parameter.

22. The at least one non-transitory computer readable medium of claim 21, comprising instructions to transmit the encoded video frame to an object detector of a remote server.

23. The at least one non-transitory computer readable medium of claim 21, comprising instructions to detect a third region of interest based on a received object detection in a previous frame received from a remote server.

24. The at least one non-transitory computer readable medium of claim 21, comprising instructions to detect a third region of interest based on a detected new object.

25. The at least one non-transitory computer readable medium of claim 21, comprising instructions to encode an area of the video frame corresponding to the first region of interest and the second region of interest in higher fidelity and an area of the video frame not corresponding to any region of interest in lower fidelity.

* * * * *